US011055364B2

(12) United States Patent
Arquero et al.

(10) Patent No.: US 11,055,364 B2
(45) Date of Patent: Jul. 6, 2021

(54) PARKING SEARCH TIME ESTIMATION USING COGNITIVE ANALYTICS

(71) Applicant: International Business Machines Corporation, Armonk, NY (US)

(72) Inventors: Gregg M. Arquero, Poughkeepsie, NY (US); Steven N. Burchfield, Woodstock, NY (US)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 15/826,991

(22) Filed: Nov. 30, 2017

(65) Prior Publication Data

US 2019/0163826 A1 May 30, 2019

(51) Int. Cl.
G06F 16/00 (2019.01)
G06F 16/951 (2019.01)
G06N 20/00 (2019.01)
G08G 1/14 (2006.01)

(52) U.S. Cl.
CPC ........... *G06F 16/951* (2019.01); *G06N 20/00* (2019.01); *G08G 1/14* (2013.01)

(58) Field of Classification Search
CPC ......... G06F 16/951; G06N 20/00; G08G 1/14
USPC ....................................................... 707/769
See application file for complete search history.

(56) References Cited

U.S. PATENT DOCUMENTS

| 7,516,010 B1* | 4/2009 | Kaplan | G01C 21/30 |
| | | | 701/426 |
| 7,538,690 B1* | 5/2009 | Kaplan | G01C 21/20 |
| | | | 340/932.2 |
| 7,936,284 B2* | 5/2011 | Levine | G08G 1/143 |
| | | | 340/928 |
| 7,949,464 B2* | 5/2011 | Kaplan | G06Q 50/24 |
| | | | 701/426 |
| 8,423,275 B1 | 4/2013 | Kandal | |
| 8,847,791 B1 | 9/2014 | Urbach | |
| 8,996,286 B1 | 3/2015 | Klein | |
| 9,177,475 B2 | 11/2015 | Sellschopp | |
| 9,275,392 B2 | 3/2016 | Potkonjak | |
| 9,299,256 B2* | 3/2016 | Chen | G08G 1/143 |
| 9,330,570 B2 | 5/2016 | Wang | |

(Continued)

FOREIGN PATENT DOCUMENTS

CN 204087502 U 1/2015
WO PCT-03005323 A1 1/2003

OTHER PUBLICATIONS

"System and Method to Estimate Time to Parking Space Availability", An IP.com Prior Art Database Technical Disclosure, Authors et. al.: Disclosed Anonymously, IP.com No. IPCOM000228684D, IP.com Electronic Publication Date: Jun. 28, 2013, 4 pages.

(Continued)

*Primary Examiner* — Monica M Pyo
(74) *Attorney, Agent, or Firm* — Andrew Aubert

(57) ABSTRACT

Machine logic (for example, software) for estimating how much time it will take to find a parking space for a vehicle at a destination. The machine logic rules request historical data to initially train a machine learning algorithm for estimating how much time it will take to find a parking space, and then estimates how long it will take to find a parking space when provided with a set of parking factors for an intended destination and route.

20 Claims, 4 Drawing Sheets

(56) References Cited

U.S. PATENT DOCUMENTS

| | | | |
|---|---|---|---|
| 9,443,428 B2* | 9/2016 | Amir | G01C 21/3685 |
| 9,470,540 B1* | 10/2016 | Castellucci | G01C 21/3605 |
| 2011/0099126 A1* | 4/2011 | Belani | G06Q 30/0284 |
| | | | 705/418 |
| 2015/0066545 A1* | 3/2015 | Kotecha | G06Q 10/02 |
| | | | 705/5 |
| 2015/0088790 A1 | 3/2015 | Chidlovskii | |
| 2017/0138746 A1 | 5/2017 | Eliassi | |
| 2017/0191849 A1 | 7/2017 | Agam | |

OTHER PUBLICATIONS

"Traffic GPS Review", Jan. 1, 2008, 38 pages, <http://www.gpsreview.net/traffic/>.

* cited by examiner

PARKING SEARCH TIME ESTIMATION USING COGNITIVE ANALYTICS

BACKGROUND

The present invention relates generally to the field of cognitive analytics, and more particularly to cognitive analytics applied to parking.

It is known that navigation systems such as Global Positioning System (GPS) devices estimate how long it will take a driver to reach an intended destination. Upon reaching the intended destination, a driver often will have to find a space to park their vehicle while they spend some amount of time at the intended destination. Parking spaces exist in many sizes and varieties, including paid or free, time-available, covered or open, and curbside or off-street. The availability of spaces may fluctuate due to many reasons.

U.S. Pat. No. 9,443,428 ("Amir") states as follows: "for each of a number of street parking regions called "parking segments" or "segments," a probability that at least one suitable street parking spot will be available in the segment . . . . The facility in turn determines this probability for each of these segments based upon earlier observations of space availability in the segment at the same or similar times and days of week . . . the facility determines the segment's probability using a statistical model that predicts an expected number of available spots in a segment based upon attributes of the segment, such as total number of spots, geographic location, link, and number of businesses; context information such as date, time, date week, current weather; and information about events that may impact parking such as sporting events, school attendance, and holidays . . . the facility constructs a polynomial regression model for each class of segments . . . . [A] user interface diagram showing a sample display presented by the facility in a parker client in some embodiments that shows the amount of time the facility predicts it will take for the user to find parking near the destination . . . . The display further includes an indication . . . of the amount of time the facility predicts it will take the user to find parking without using a route recommended by the facility, and having indication . . . of the amount of time the facility predicts it will take for the user-defined parking using a route recommended by the facility."

SUMMARY

According to an aspect of the present invention, there is a method, computer program product and/or system that performs the following operations (not necessarily in the following order): (i) receiving a historical parking factors data set; (ii) training a time to park algorithm based, at least in part, on the historical parking factors data set; (iii) receiving a target destination data set, where the target destination data set includes a route to a target destination for a vehicle; (iv) querying, from a parking factors server, a parking factors data set, where the parking factors data set includes parking factors along the route to the target destination and at the target destination; (v) responsive to receiving the parking factors data set, determining an approximate time to park based, at least in part, the time to park algorithm using the parking factors data set as input; and (vi) responsive to the vehicle parking at the target destination, updating the time to park algorithm based, at least in part, on parking factors present prior to the vehicle parking at the target destination.

DETAILED DESCRIPTION

Figure 1:
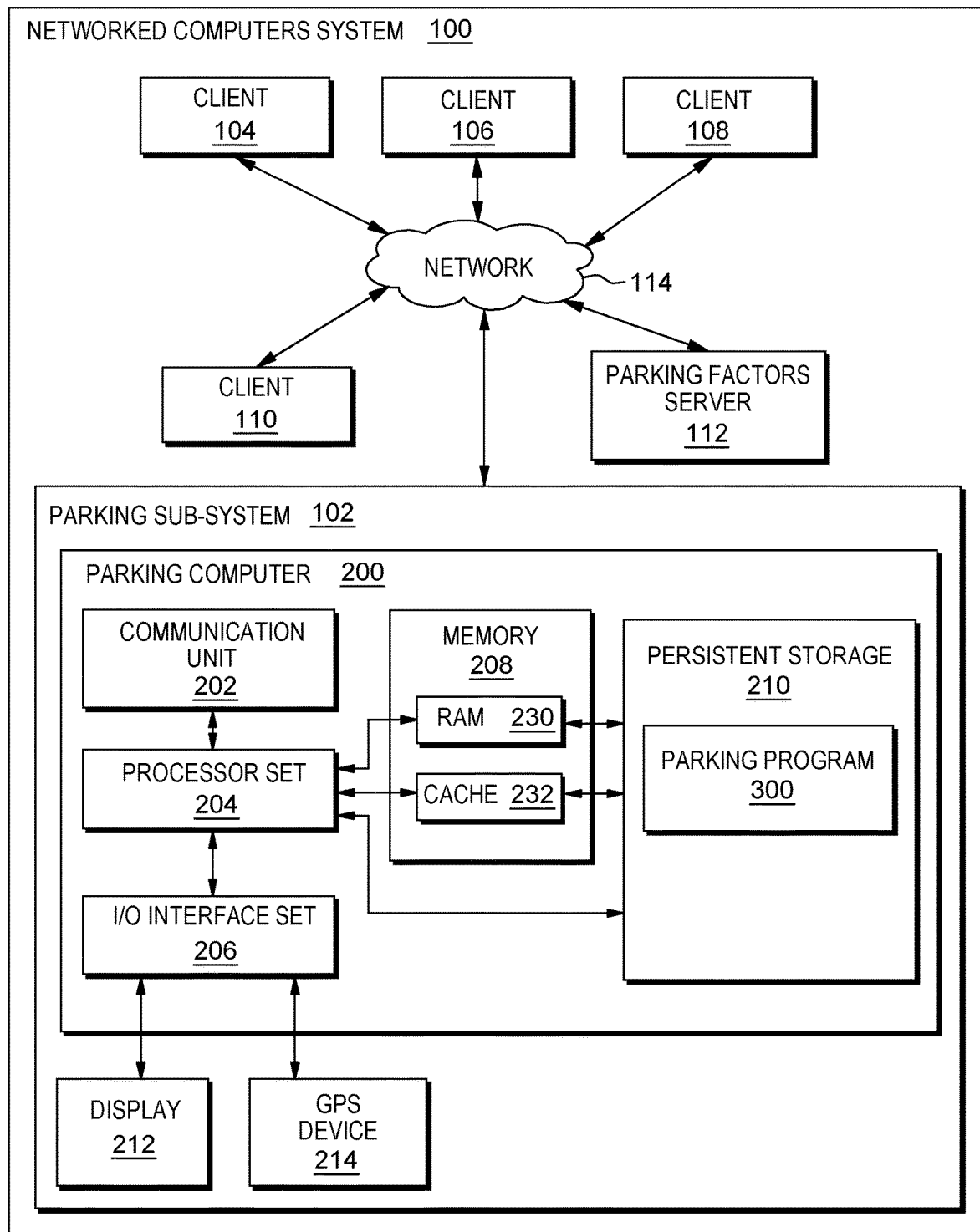
FIG. 1 is a block diagram view of a first embodiment of a system according to the present invention.

Some embodiments of the present invention are directed to machine logic (for example, software) for estimating how much time it will take to find a parking space for a vehicle at a destination. In some embodiments, machine logic rules request historical data to initially train a machine learning algorithm for estimating how much time it will take to find a parking space, and then estimates how long it will take to find a parking space when provided with a set of parking factors for an intended destination and route. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: parking sub-system 102; client sub-systems 104, 106, 108, 110; parking factors server 112; communication network 114; parking computer 200; communication unit 202; processor set 204; input/output (I/O) interface set 206; memory device 208; persistent storage device 210; display device 212; Global Positioning System (GPS) device 214; random access memory (RAM) devices 230; cache memory device 232; and parking program 300.

Parking sub-system 102 is, in many respects, representative of the various computer sub-system(s) in the present invention. Accordingly, several portions of parking sub-system 102 will now be discussed in the following paragraphs.

Parking sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Parking program 300 is a collection of machine readable instructions and/or data that is used to create, manage and control certain software functions that will be discussed in detail, below, in the Example Embodiment sub-section of this Detailed Description section.

Parking sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Parking sub-system 102 is shown as a block diagram with many double arrows. These double arrows (no separate reference numerals) represent a communications fabric, which provides communications between various components of parking sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) GPS device(s) 214 may be able to supply, some or all, memory for parking sub-system 102; and/or (ii) devices external to parking sub-system 102 may be able to provide memory for parking sub-system 102.

Parking program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Parking program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to parking sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with parking computer 200. For example, I/O interface set 206 provides a connection to GPS device 214. GPS device 214 will typically include devices such as a keyboard, keypad, a touch screen, and/or some other suitable input device. GPS device 214 can also include portable computer-readable storage media such as, for example, thumb drives, portable optical or magnetic disks, and memory cards. Software and data used to practice embodiments of the present invention, for example, parking program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
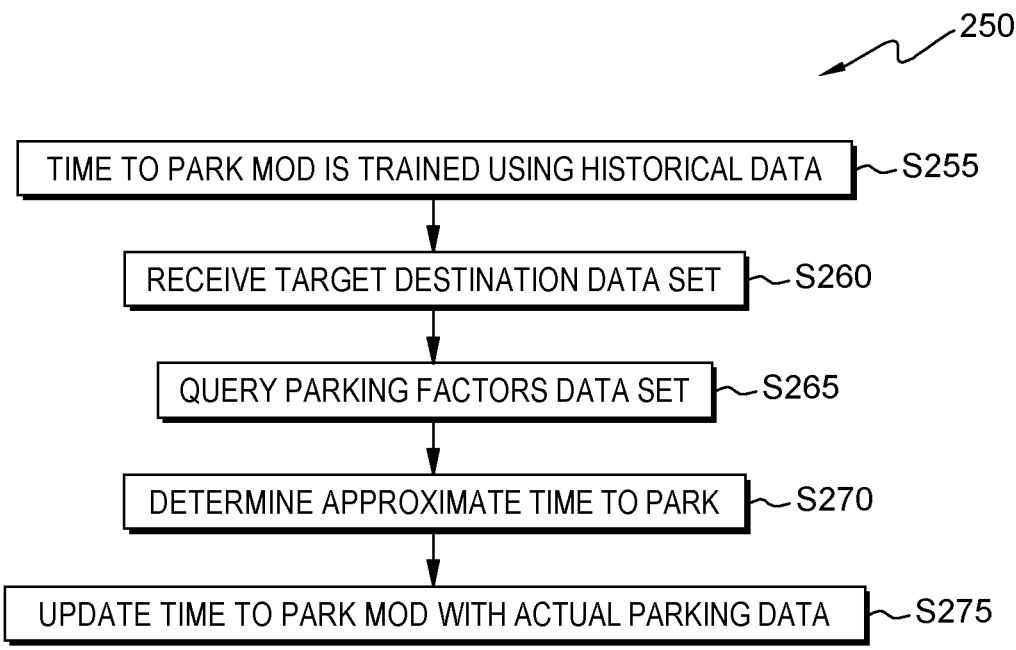
FIG. 2 is a flowchart showing a first embodiment method performed, at least in part, by the first embodiment system.
Figure 3:
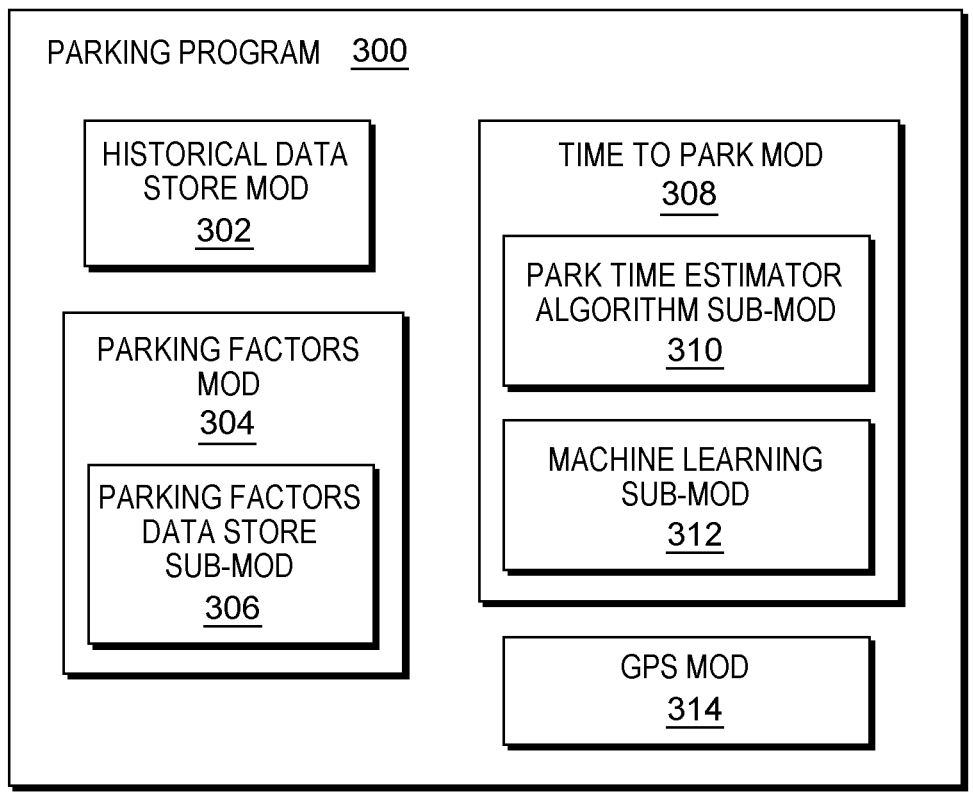
FIG. 3 is a block diagram showing a machine logic (for example, software) portion of the first embodiment system.

FIG. 2 shows flowchart 250 depicting a method according to the present invention. FIG. 3 shows parking program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where machine learning sub-module ("sub-mod") 312 of FIG. 3 trains park time estimator algorithm sub-mod 310 using historical data from historical data store module ("mod") 302. In this example embodiment, historical data includes historical parking factors data for a plurality of vehicle travel and parking events including: (i) weather; (ii) traffic conditions; (iii) time of day; (iv) day of the week; (v) calendar date; (vi) size of vehicle; (vii) average parking space prices; and (viii) average time to park. The machine learning sub-mod uses the historical parking factors data to train an algorithm to determine an approximate amount of time it would take on average to find a parking space upon reaching a destination in a plurality of circumstances when provided a set of parking factors and a target destination. As an alternative, any other circumstances with an impact on how long it might take to find a parking space may be considered as parking factors such as: (i) planned or ongoing construction events; (ii) number of parking spaces existing in a region; (iii) currently available parking capacity of designated parking structures and lots; (iv) festivities and sporting events; and/or (v) organized conventions.

Processing proceeds to operation S260, where time to park mod 308 receives a target destination data set from global positioning system (GPS) mod 314. In this example embodiment, a user in a vehicle with a GPS system, such as GPS device 214 of FIG. 1, inputs a target destination of the federal courthouse in Chicago, Ill. GPS mod 314 provides time to park mod 308 with the target destination and a recommended travel route to the target destination from a current location of the vehicle. Estimated time of arrival is also provided to time to park mod 308, which is 8:45 AM in this example.

Processing proceeds to operation S265, where parking factors mod 304 queries parking factors server 112 of FIG. 1 for a parking factors data set and stores the parking factors data set in parking factors data store sub-mod 306 of FIG. 3. In this example embodiment, the parking factors queried include: (i) day of the week (Monday); (ii) calendar date (Nov. 6, 2017); (iii) weather conditions at the target destination (snowing); (iv) traffic conditions at the target destination (30 minutes of congestion or more); and (v) size of vehicle (standard car). Other size of vehicle options can include: (i) motorcycles; (ii) large trucks; (iii) tractor-trailers; (iv) bicycles; and (v) compact cars. In this example embodiment, the parking factors server is a server that contains all of the parking factors. As an alternative, parking factors can be queried from a plurality of locations and compiled together in the parking factors data store sub-mod.

Processing proceeds to operation S270, where park time estimator algorithm sub-mod 310 determines an estimated time to park using the park time estimator algorithm sub-mod with the target destination data set and parking factors data set as inputs. In this example embodiment, based upon the training of the park time estimator algorithm sub-mod at S255, park-time estimator algorithm sub-mod 310 outputs an estimated time until finding parking as fifteen minutes when receiving the following inputs: (i) day of the week (Monday); (ii) calendar date (Nov. 6, 2017); (iii) weather conditions at the target destination (snowing); (iv) traffic conditions at the target destination (30 minutes of congestion or more); (v) size of vehicle (standard car); and (vi) estimated time of arrival 8:45 AM.

Figure 4:
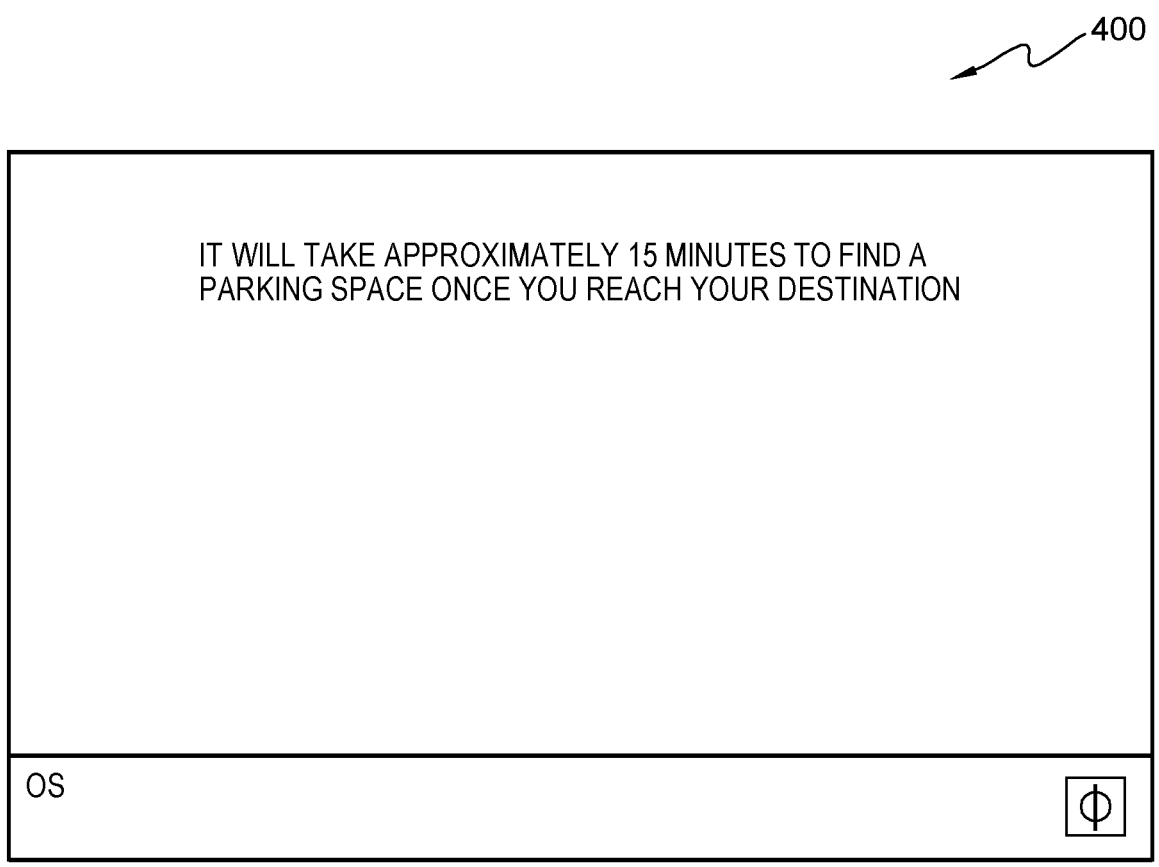
FIG. 4 is a screenshot view generated by the first embodiment system.

Processing proceeds to operation S275, where machine learning sub-mod 312 updates the park time estimator algorithm sub-mod based on how long it took to park and prevailing parking factors prior to parking. In this example embodiment, the vehicle parks ten minutes after arriving near the target destination. Machine learning sub-mod 312 updates the park time estimator algorithm sub-mod to reflect that the parking factors used as input at S270 yielded a time to park five minutes greater than how long it actually took to park, such that the next time identical or substantially similar inputs are provided, the estimated time to park determined by park time estimator algorithm sub-mod would be closer to ten minutes than the fifteen minutes that was determined at S270. This estimated time to park of 15 minutes can be communicated to a user via a user interface, such as shown in user interface 400 of FIG. 4.

III. Further Comments and/or Embodiments

Some embodiments of the present invention recognize the following facts, potential problems and/or potential areas for improvement with respect to the current state of the art: (i) often times, drivers will arrive at a destination and find that there is nowhere to park; (ii) drivers will either circle around or give up, costing both time and gas money; (iii) currently, drivers try to use experience-based rules to know when to avoid parking in certain areas, such as Manhattan is busy at rush hour or there's never a place to park in Queens on the weekend; and (iv) these rules can be helpful, but they can be vague and not up-to-date with current information such as weather and special events.

Some embodiments of the present invention may include one, or more, of the following features, characteristics and/or advantages: (i) some embodiments of the present invention aims to use traffic patterns and other factors to give a user an estimate of how long it will take to find a parking spot; (ii) some embodiments of the present invention works by taking into account factors such as time of day, day of the week, weather, and current traffic patterns to determine the average length of time a user will have to search for parking in a given area via a cognitive algorithm described below; (iii) some embodiments of the present invention will output a time range to users estimating how long it will take to find parking in the given area; and/or (iv) providing real time estimates on how easy it is to find parking in a specific area by analyzing traffic patterns around the area.

Some embodiments of the present invention may include one, or more, of the following features, characteristics and/or advantages: (i) factors like weather and current traffic will be generated using information available on: (a) local weather websites, (b) traffic databases, (c) traffic data suppliers, (d) collect data from road sensors, (e) local departments of transportation, (f) data collected from operators of large fleets of vehicles, and/or (g) other manual sources such as traffic helicopters and listening to police scanners; and/or (ii) this information is stored in a database that will be referenced by an algorithm.

Some embodiments of the present invention may include one, or more, of the following features, characteristics and/or advantages: (i) a sufficient data gathering period that takes into account factors such as time of day, day of the week, weather, and current traffic when determining the length of time it took users to find parking; (ii) a user will choose a destination; (iii) the application will look at similar cases from the data gathering period and create a bell curve model of times it took for users to find parking in that area; (iv) a range of time will be determined using a probability of 80% on the bell curve; (v) the time range will be output to the user; (vi) the data of the current user will be added to the current database of previous scenarios; and/or (vii) a possible extension is that a user's estimated time of arrival from their current location will be taken into account when calculating average parking time (for example, where a user is 10 minutes away from their destination the current factors of the destination will be gathered, and the average amount of time to find parking will be calculated based on the average amount of time to find parking 10 minutes after the time of the similar case).

In some embodiments of the present invention, two of the independent variables in a linear regression can have a greater impact when they occur together rather than each really having an independent impact on the outcome (for example, it's possible that rain is more of a factor on a Saturday than rain on a Monday). This can be implemented in some embodiments of the present invention by creating separate linear regression models for two or more of the independent variables (to continue the example, having a separate linear regression model for Mondays and Saturdays). Alternatively, instead of building a linear regression model, an embodiment of the present invention pulls only the data points that exactly match a user's current conditions. These data points matching current conditions can then be used to create a bell curve model using only those data points. Some of the benefits of this alternative embodiment includes limiting the impact of unrelated data points from estimating the time to park under a current set of conditions.

Some embodiments of the present invention may include one, or more, of the following features, characteristics and/or advantages: (i) taking into account factors such as time of day, day of the week, weather, and current traffic patterns to determine the average length of time a user will have to search for parking in a given area via a cognitive algorithm described below; (ii) the system will output a time range to users estimating how long it will take to find parking in the given area; (iii) an extension to a mapping application that allows a user to select an "include parking time" option, which will then include the estimated parking time in the estimated arrival time via the algorithm described above; (iv) an extension to a mapping application that allows a user to reserve a spot at the expected arrival time estimated above; (v) the mapping application will then point the user directly to the spot reserved and make that the actual arrival location; and/or (vi) cognitive parking time estimation, parking time via traffic analysis, and an algorithm to estimate parking time.

Some embodiments of the present invention may include one, or more, of the following features, characteristics and/or advantages: (i) use what the current conditions are like to find instances that are similar in the past and how long it took the person to park; (ii) compare across similar conditions such that there is no dependence on the time of day or week; and/or (iii) also consider weather as a prominent factor in estimating time to park (for example: if at time t1, traffic/weather/etc. conditions are similar to time t2 in the past for a given location, estimate the length of time it will take a user to find parking at time t1 based on statistical analysis of time t2. If a user will not arrive at the location until time t1+5, some embodiments of the present invention can base the analysis off of time t2+5 in the past).

Some embodiments of the present invention may include one, or more, of the following features, characteristics and/or advantages: (i) heavy reliance on software; (ii) consider other important information such as weather; (iii) provide users a time estimation for parking, not only if there are available spots; (iv) not limited in scope to parking facilities/garages; (v) perform statistical analysis on traffic and weather information which are key factors and provide an estimated time to park; (vi) perform statistical analysis of traffic information; and/or (vii) estimate the time to find a parking spot within an area based on traffic conditions.

Some embodiments of the present invention may include one, or more, of the following features, characteristics and/or advantages: (i) an algorithm for determining estimated parking time based on historic data, including traffic patterns, weather, time of day, day of the week, etc.; (ii) an extension to a mapping application that allows a user to select an "include parking time" option, which will then include the estimated parking time in the estimated arrival time via the algorithm described above; (iii) an extension to a mapping application that allows a user to reserve a spot at the expected arrival time estimated above; and/or (iv) the mapping application will then point the user directly to the spot reserved and make that the actual arrival location.

Some embodiments of the present invention use historical data to train a machine learning model on factors such as weather, time of day, etc. and then feeds in real-time factors to estimate how long it took users to find parking in the past under similar conditions. Some embodiments of the present invention do not merely provide an index of the difficulty of finding parking, but instead predict an amount of time that the user will search for parking. Some embodiments of the present invention can also be extended to include predictions for future parking situations by predicting the values of the inputs into the algorithm.

Some embodiments of the present invention use historical data to train a machine learning model on factors such as weather, time of day, etc. and then feeds in real-time factors to estimate how long it took users to find parking in the past under similar conditions. Some embodiments of the present invention rely less on expensive methods of trying to find out information about a current parking situation (image analysis, sensors, etc.), and instead relies on historical factors that are relatively easy to gather (time of day, day of week, weather, traffic) which can then be translated into an estimated parking time more easily using historical data. Likewise, some embodiments of the present invention can be expanded to easily incorporate any other relevant data points. Some embodiments of the present invention can also be extended to include predictions for future parking situations by predicting the values of the inputs into an algorithm that tries to predict the future parking situation in itself.

Some embodiments of the present invention may include one, or more, of the following features, characteristics and/or advantages: (i) using a variety of factors to train a machine learning model; (ii) feeding in real-time factors to estimate how long it took users to find parking in the past under similar conditions; (iii) accounting for a greater number of variations that may impact the amount of time it takes a user to find parking, such as weather and traffic; (iv) easily expanding to incorporate any other relevant data points; (v) using weather as one of a number of parameters in generating a machine learning model to calculate an approximate amount of time to find parking; (vi) creating a model for estimating the amount of time it will take to find parking in a given location; and/or (vii) including an algorithm that relies on known machine learning techniques used to estimate values, such as training models, regressions, etc.

Some embodiments of the present invention may include one, or more, of the following features, characteristics and/or advantages: (i) an algorithm that estimates an amount of time to park by considering factors such as date, time, day of the week, current weather, current and recent traffic conditions, and amount of users currently searching for a space; (ii) consider recent changes in weather conditions to reflect changes in time to park (for example, parking availability near a beach might be imminently plentiful when a lightning strike is reported nearby, or a report of expected snowfall might increase the amount of time expected to find parking in an area with primarily street parking, which cannot be occupied by vehicles when plowing is to occur); (iii) associate event data without knowing anything about the event itself (for example, school attendance will follow a consistent traffic pattern, most likely high traffic followed by a quick drop off to very low traffic); (iv) associate traffic patterns with the data points matching the pattern, supplemented by recorded event information; (v) current traffic also impacts the amount of time to find a space by indicating an amount of drivers that have a chance to take a space before a user practicing an embodiment of the invention reaches their destination; (vi) inherently associates probability of finding a space with the amount of time a user is willing to look; (vii) comparing the estimated amount of time to park for different areas; (viii) recommend an area to try to park; and (ix) tell a user how long it will take to park so they can better estimate an arrival time.

Figure 5:
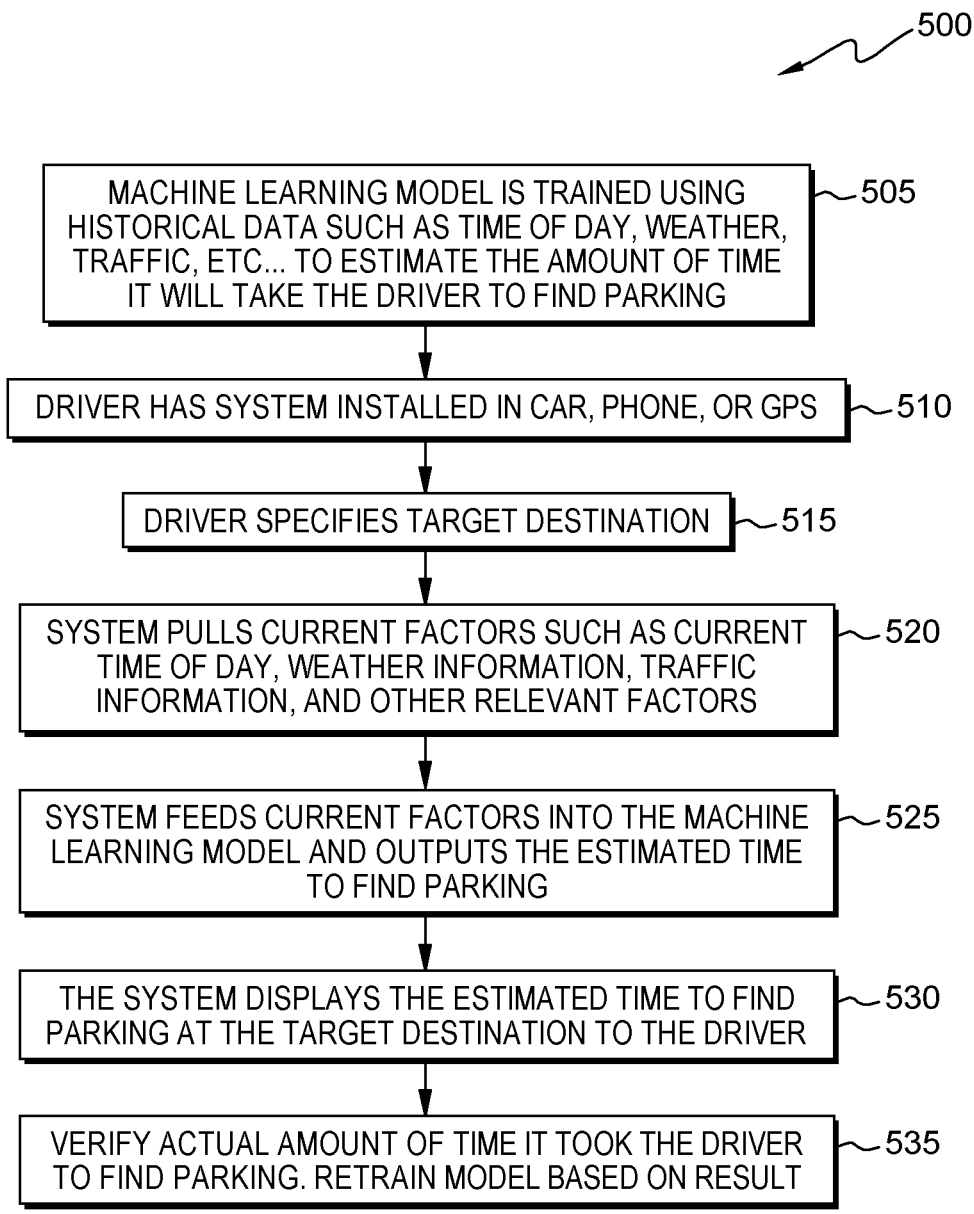
FIG. 5 is a flowchart of a second embodiment of a method according to the present invention.

Some embodiments of the present invention are directed towards a method, computer program product (CPP), and/or system as shown in flowchart 500 of FIG. 5, including the following steps: (i) at 505, a machine learning model is trained using historical data such as time of day, weather, traffic, etc. to estimate the amount of time it will take a driver to find parking; (ii) at 510, the driver has a program including a software implementation of the present invention installed in their car, phone, or Global Positioning System (GPS) device; (iii) at 515 the driver specifies a destination; (iv) at 520 the program pulls current factors such as current time of day, weather information, traffic information, and other relevant factors; (v) at 525 the program feeds the current factors into the machine learning model and outputs an estimated time to find parking; (vi) at 530 the program displays to the driver the estimated time to find parking at the destination; and (vii) at 535 the program verifies the actual amount of time it took to the driver to find parking and retrains the machine learning model based on the result.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

Weather conditions includes: fog, rain, sleet, snow, and wind.

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   receiving, by one or more computer processor(s), a historical parking factors data set;
   training, by the one or more computer processor(s), a time to park algorithm based, at least in part, on the historical parking factors data set;
   receiving, by the one or more computer processor(s), a target destination data set, where the target destination data set includes a route to a target destination for a vehicle;
   querying, from a parking factors server, by the one or more computer processor(s), a parking factors data set, where the parking factors data set includes parking factors along the route to the target destination and at the target destination;
   determining, by the one or more computer processor(s), an estimated time of arrival at the target destination for the vehicle by traversing the route based, at least in part, on the parking factors data set;
   determining, by the one or more computer processor(s), an approximate time to park based, at least in part, on the time to park algorithm, with the time to park algorithm using the parking factors data set and the estimated time of arrival as inputs to determine an estimated quantity of time required to locate and park at an available parking space near the target destination during conditions present near the target destination at the estimated time of arrival;
   outputting, by the one or more computer processor(s), to a computer display, a combined arrival and park time based on the estimated time of arrival and the approximate time to park; and
   responsive to the vehicle parking at the target destination, updating, by the one or more computer processor(s), the time to park algorithm based, at least in part, on parking factors present prior to the vehicle parking at the target destination.

2. The method of claim 1, further comprising:
   displaying, by the one or more computer processor(s), on a graphical user interface, the estimated quantity of time required to locate and park at an available parking space near the target destination.

3. The method of claim 1, wherein the historical parking factors data set includes: (i) weather; (ii) traffic conditions; (iii) time of day; (iv) day of the week; (v) calendar date; (vi) size of vehicle; (vii) average parking space prices; and (viii) average time to park.

4. The method of claim 1, wherein the parking factors data set includes: (i) weather; (ii) traffic conditions; (iii) time of day; (iv) day of the week; (v) calendar date; (vi) size of vehicle; (vii) average parking space prices; and (viii) estimated time of arrival.

5. The method of claim 1, further comprising:
   selecting, by the one or more computer processor(s), a time to park estimation feature for a target destination.

6. The method of claim 1, wherein the updating the time to park algorithm updates the algorithm based on how much time elapsed between the vehicle arriving near the target destination and the vehicle parking at the target destination.

7. A computer program product comprising:

a machine readable storage device; and computer code stored on the machine readable storage device, with the computer code including instructions for causing a processor(s) set to perform operations including the following:

receiving a historical parking factors data set, training a time to park algorithm based, at least in part, on the historical parking factors data set, receiving a target destination data set, where the target destination data set includes a route to a target destination for a vehicle, querying, from a parking factors server, a parking factors data set, where the parking factors data set includes parking factors along the route to the target destination and at the target destination, determining an approximate time to park based, at least in part, on the time to park algorithm, with the time to park algorithm using the parking factors data set and the estimated time of arrival as inputs to determine an estimated quantity of time required to locate and park at an available parking space near the target destination during conditions present near the target destination at the estimated time of arrival, outputting, to a computer display, a combined arrival and park time based on the estimated time of arrival and the approximate time to park, and responsive to the vehicle parking at the target destination, updating the time to park algorithm based, at least in part, on parking factors present prior to the vehicle parking at the target destination.

8. The product of claim 7, further comprising:

displaying, on a graphical user interface, the estimated quantity of time required to locate and park at an available parking space near the target destination.

9. The product of claim 7, wherein the historical parking factors data set includes: (i) weather; (ii) traffic conditions; (iii) time of day; (iv) day of the week; (v) calendar date; (vi) size of vehicle; (vii) average parking space prices; and (viii) average time to park.

10. The product of claim 7, wherein the parking factors data set includes: (i) weather; (ii) traffic conditions; (iii) time of day; (iv) day of the week; (v) calendar date; (vi) size of vehicle; (vii) average parking space prices; and (viii) estimated time of arrival.

11. The product of claim 7, wherein the computer code further includes instructions for causing the processor(s) set to perform the following operations:

selecting a time to park estimation feature for a target destination.

12. The product of claim 7, wherein the updating the time to park algorithm updates the algorithm based on how much time elapsed between the vehicle arriving near the target destination and the vehicle parking at the target destination.

13. A computer system comprising:

a processor(s) set;

a machine readable storage device; and computer code stored on the machine readable storage device, with the computer code including instructions for causing the processor(s) set to perform operations including the following:

receiving a historical parking factors data set, training a time to park algorithm based, at least in part, on the historical parking factors data set, receiving a target destination data set, where the target destination data set includes a route to a target destination for a vehicle, querying, from a parking factors server, a parking factors data set, where the parking factors data set includes parking factors along the route to the target destination and at the target destination, determining an approximate time to park based, at least in part, on the time to park algorithm, with the time to park algorithm using the parking factors data set and the estimated time of arrival as inputs to determine an estimated quantity of time required to locate and park at an available parking space near the target destination during conditions present near the target destination at the estimated time of arrival, outputting, to a computer display, a combined arrival and park time based on the estimated time of arrival and the approximate time to park, and responsive to the vehicle parking at the target destination, updating the time to park algorithm based, at least in part, on parking factors present prior to the vehicle parking at the target destination.

14. The system of claim 13, further comprising:

displaying, on a graphical user interface, the estimated quantity of time required to locate and park at an available parking space near the target destination.

15. The system of claim 13, wherein the historical parking factors data set includes: (i) weather; (ii) traffic conditions; (iii) time of day; (iv) day of the week; (v) calendar date; (vi) size of vehicle; (vii) average parking space prices; and (viii) average time to park.

16. The system of claim 13, wherein the parking factors data set includes: (i) weather; (ii) traffic conditions; (iii) time of day; (iv) day of the week; (v) calendar date; (vi) size of vehicle; (vii) average parking space prices; and (viii) estimated time of arrival.

17. The system of claim 13, wherein the computer code further includes instructions for causing the processor(s) set to perform the following operations:

selecting a time to park estimation feature for a target destination.

18. The system of claim 13, wherein the updating the time to park algorithm updates the algorithm based on how much time elapsed between the vehicle arriving near the target destination and the vehicle parking at the target destination.

19. The method of claim 2, wherein the displayed estimated quantity of time is a range of time values.

20. The product of claim 8, wherein the displayed estimated quantity of time is a range of time values.

* * * * *